Oct. 6, 1970 D. A. BAUMANN ET AL 3,532,861

DIGITAL OPERATIONS SYSTEM FOR AN ANALOG COMPUTER

Filed Dec. 30, 1963 9 Sheets-Sheet 1

Oct. 6, 1970 D. A. BAUMANN ET AL 3,532,861

DIGITAL OPERATIONS SYSTEM FOR AN ANALOG COMPUTER

Filed Dec. 30, 1963 9 Sheets-Sheet 3

Oct. 6, 1970 D. A. BAUMANN ET AL 3,532,861

DIGITAL OPERATIONS SYSTEM FOR AN ANALOG COMPUTER

Filed Dec. 30, 1963 9 Sheets-Sheet 5

DIGITAL OPERATIONS SYSTEM FOR AN ANALOG COMPUTER

United States Patent Office 3,532,861

Patented Oct. 6, 1970

3,532,861

DIGITAL OPERATIONS SYSTEM FOR AN ANALOG COMPUTER

Donald A. Baumann, Middletown, Thomas D. Truitt, Princeton, James Bruno, Jr., Little Silver, and Jay Paul Landauer, Trenton, N.J., assignors to Electronic Associates Inc., Long Branch, N.J., a corporation of New Jersey Filed Dec. 30, 1963, Ser. No. 334,107
Int. Cl. G06j *1/00*
U.S. Cl. 235—150.5 23 Claims

ABSTRACT OF THE DISCLOSURE

An analog computing system is provided with a plurality of digital logic elements interconnected to provide any logical or Boolean function including arithmetical functions as well as with digital memory capabilities all of which are adapted to operate in parallel with the analog computing elements without the requirement for a program control of the instruction sequence type. Such logic elements and memory elements and also registers have their input and output terminals arranged in a plug board for selective interconnection with the respective analog computing elements in accordance with any particular problem to be simulated by the computing system. For particular problems of a nature requiring a special purpose computer, such interconnections may be permanently wired or, in the case of a general purpose system adapted to simulate a variety of different problems, the interconnections may be of the reversible type achieved with computer plug boards. In addition, means are provided by which various analog computing elements may be automatically connected or disconnected in response to digital signals generated by the interconnected logic elements.

This invention relates generally to computing systems and more particularly to a parallel logic machine for controlling the mathematical capabilities of an analog computer.

In general purpose analog computers, variable are set by adjustment of selected voltages as defined by a problem to be solved. As described in "Basics of Analog Computers," by Truit and Rogers, Rider, 1960, computing elements are connected together and made operative to vary the selected voltages in accordance with desired equations. In this way, the computing elements each perform mathematical operations simultaneously with instantaneous flow of information between elements. As a result, a continuous real time output may be taken of desired variables and, for these reasons, the analog computer is a completely parallel signal processor. However, analog computers have the limitations that logical decisions are not easily provided; analog memories are inherently complex and analog computers cannot readily accept high speed input data and produce high speed output data. Thus, analog computers are limited in their ability to solve problems requiring logical decisions and are deficient in providing for extensive memory and high speed input and output data. For example, such problems may comprise differential equations to be solved at high speed, their solutions for different initial conditions or parameters being used in a prediction, iteration or optimization process.

While some of these limitations have been solved by combining an analog computing system with a digital computing system, as described, for example, in "Handbook of Automation, Computation and Control," volume 2, Wiley, 1959, pp. 30–01 et. seq., such prior combined systems left much to be desired as a result of the basic differences between an analog and a digital computer.

The analog computer as a parallel machine performs all computations simultaneously, while the digital computer performs all computations sequentially with only one operation taking place at any one time. Thus, even with effective conversion equipment, the analog computer functioned by itself and the digital computer also functioned by itself with no overall control of the analog computer by the relatively expensive digital computer. Thus, such prior combined systems, even though quite costly, did not provide effective means of controlling the mathematical capabilities of a general purpose analog computer.

Accordingly, an object of the present invention is a control system comprising a logic machine for controlling the mathematical capabilities of an analog computer.

Another object of the present invention is a parallel logic machine for providing an analog computer with logical decisions, a digital memory and high speed data processing capability and with such logical machine being specifically designed for control of and integration with an analog computer.

In accordance with the present invention, there is provided a logic machine comprising a plurality of logical elements capable of parallel operation and being synchronized by clock signals. The analog output signals of selected analog computing elements are converted to the form of digital information and may be stored in a memory. Selected portions of the digital information taken from the output of the memory may be applied to particular logical elements to supply the logical elements with information in parallel. In this manner a plurality of parallel logical operations may be performed by the logical elements of the logic machine with the resultant signals being converted back to analog form and applied to the analog computer. In addition, high speed input and output data may be applied to selected logical elements. As a result of this operation, the analog computing elements of the analog computer operate in parallel to perform the functions they are best suited for and the logical elements of the logic machine operate in parallel at speeds higher than a conventional digital computer to perform the functions they are best suited for.

Thus, in accordance with the invention the parallel, operating logical elements of the logic machine provide the analog computer with logical decisions, extensive memory capabilities and the ability to accept high speed input and output data. For example, the system may be utilized with the analog computer performing high speed integration of non-linear differential equations and the logic machine providing precise low speed computation of slowly changing variables. Further, samples of the computed data may be stored in the memory and logical data evaluation would be performed by the logical elements.

In addition, there is provided means for comparing the outputs of any two analog computing elements for producing, upon a change in level of either analog signal, a digital output for control of selected logical elements. There is further provided switch means responsive to the output from a logical element for producing an open circuit or a closed circuit between two analog computing elements.

In order to control the mode of the logic machine, clock signals may be applied to each of the logical elements so that these elements operate in their run mode. In addition, the clock signals may may all be disconnected from each of the logical elements so that the logical elements are maintained in their previously set state, which is a "stop mode." Further, in a "clear mode" for the logical elements, the clock pulse are disconnected from the logical elements and a signal is applied to reset the elements. The different operating modes of the analog computer may be synchronized with the different operating modes of the logic machine. Thus, for example, with the logic machine in its "run mode," the analog computer may be in its "operate mode."

The digital information which has been converted and is applied to the memory may be in the form of digital words which are recirculated by the memory to provide long term storage. Each of the words has provision for inclusion of special identification bits or flag bits. As the words are recirculated, the flag bits may be changed, advanced or retarded. In addition, new words may be applied so that they too will be recirculated. If it is desired to locate a word having a particular flag, that flag may be applied to a flag input terminal so that when the desired word is recirculated it will be identified and may be read out. In addition, that flagged word may also be entirely removed from the memory and a new word inserted in its place.

The invention may be better understood from the following detailed description of a representative embodiment thereof taken in conjunction with the accompanying drawings in which;

FIG. 1 is a block diagram illustrating a typical computing system according to the invention;

FIGS. 2–4 when taken together in the manner shown in FIG. 1 illustrate in more detail the block diagram of FIG. 1;

Figures 1, 2, 3, 4:
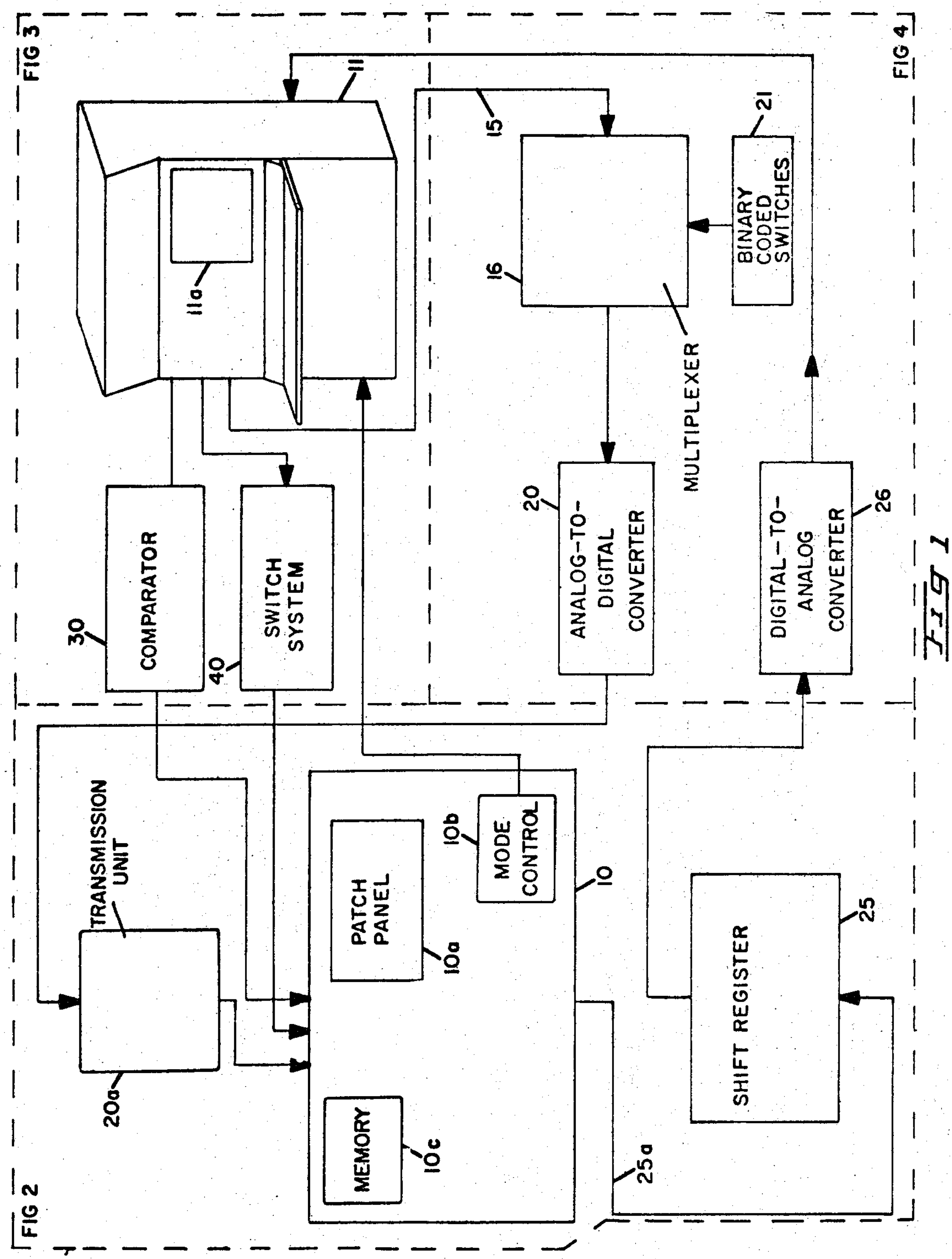
Figure 2:
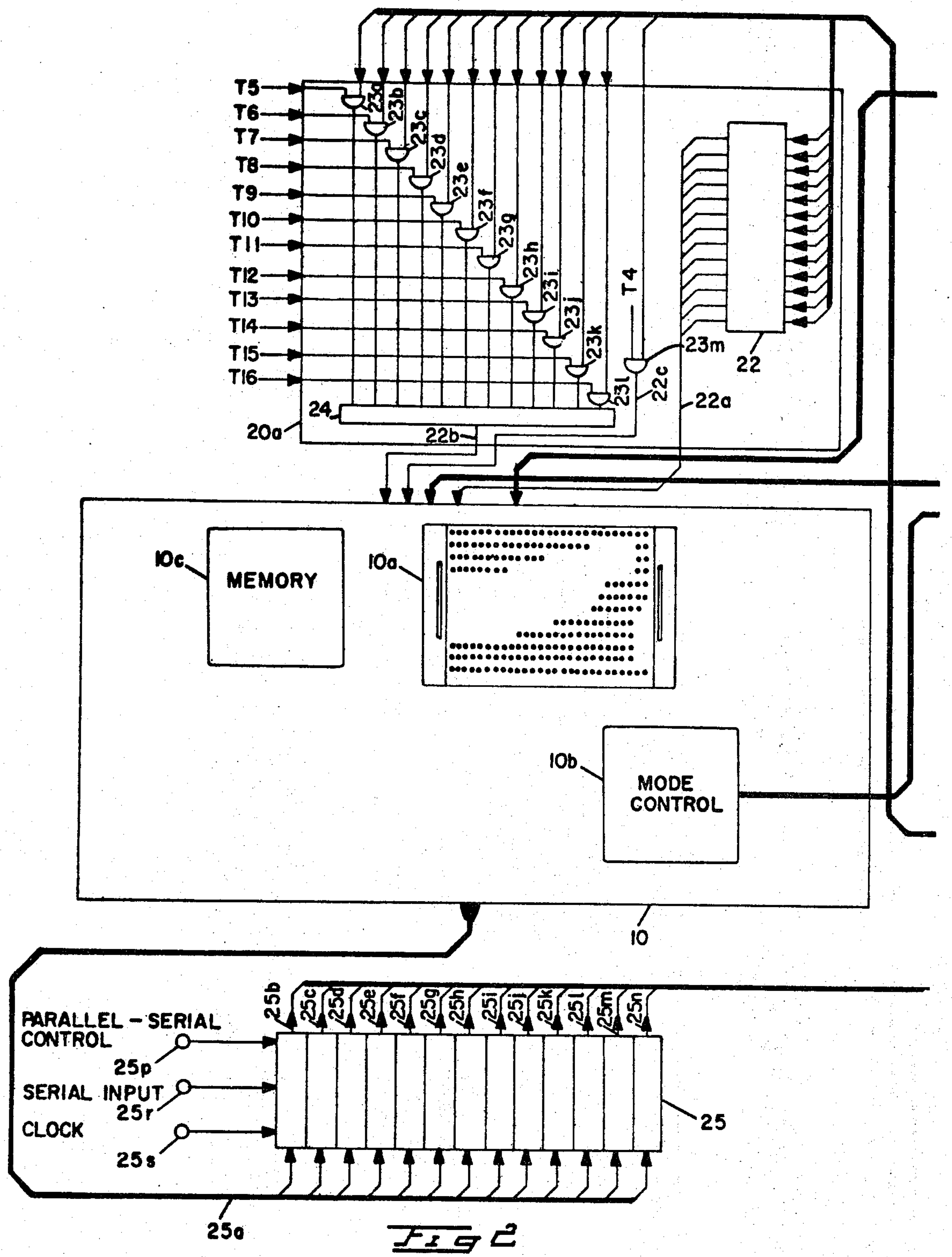
Figure 3:
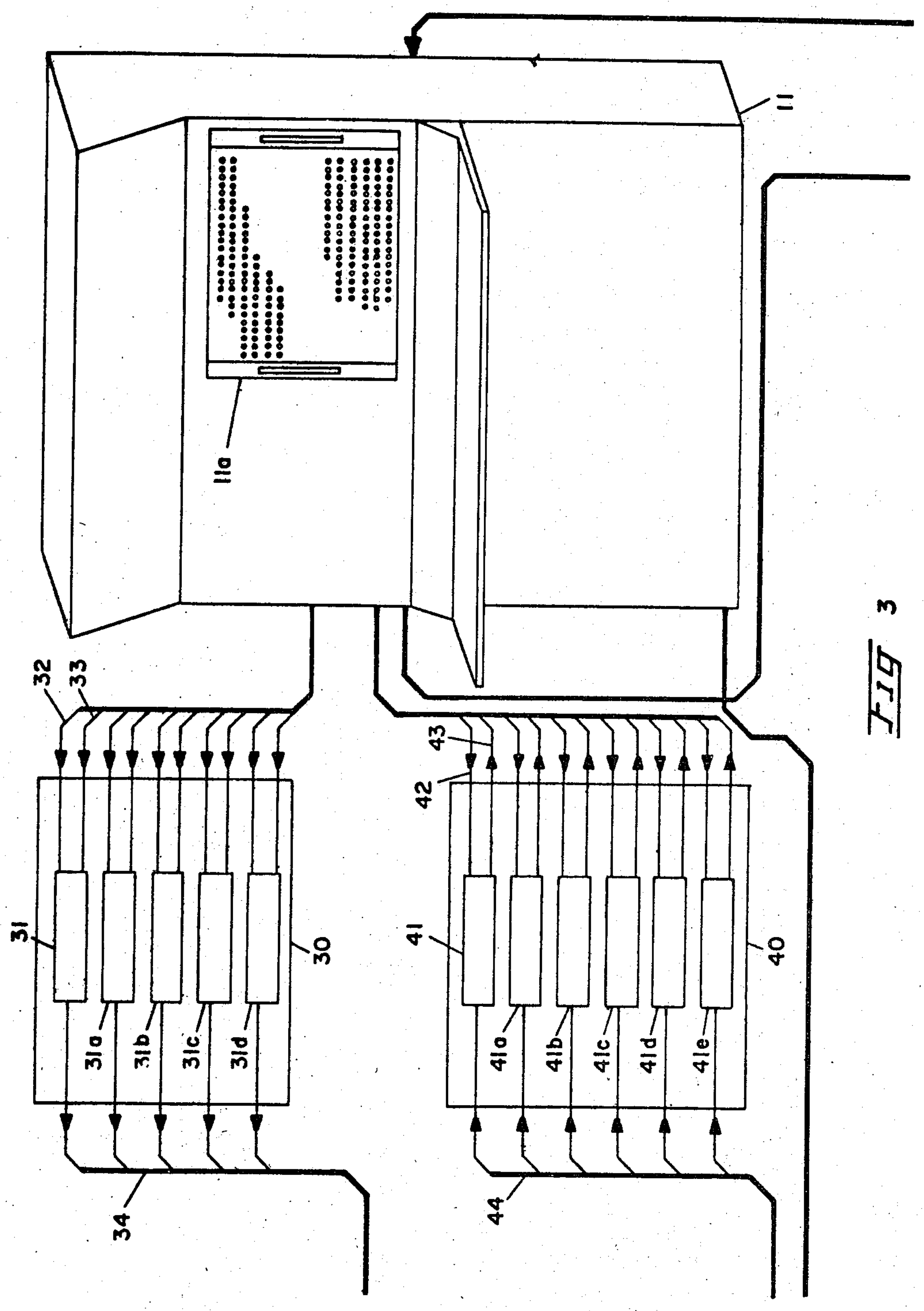
Figure 4:
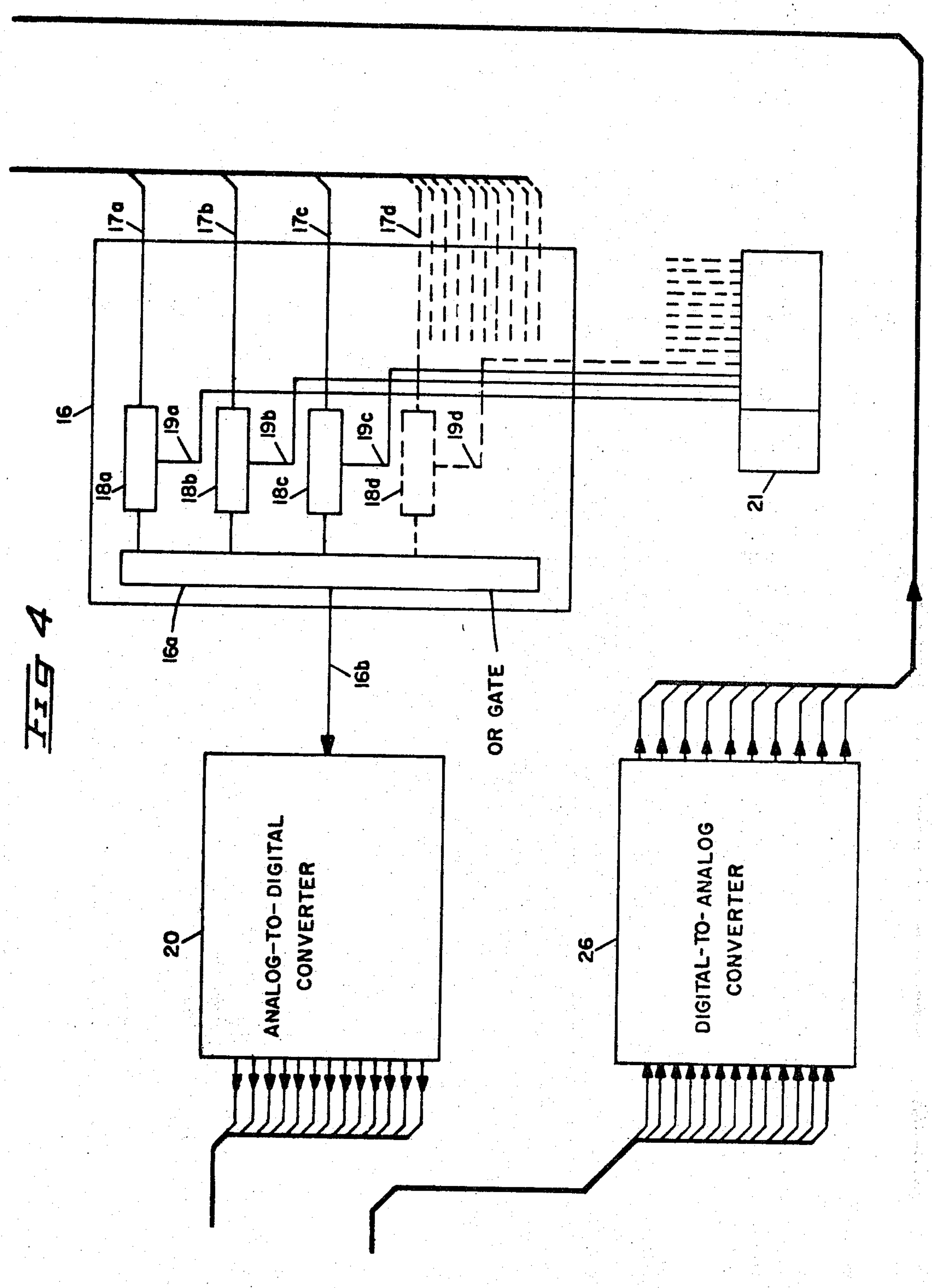

Referring now to FIG. 1, there is shown a block diagram of a parallel logic machine 10 and the manner in which it controls the mathematical capabilities of an analog computer 11. Analog signals are conducted from the analog computer 11 by way of its patch panel 11*a* and conductors 15 and to a multiplexer 16 which converts the parallel analog signals to serial form. A serial output of multiplexer 16 is applied to an analog-to-digital converter 20 which produces digital signals corresponding to each of the analog input signals applied thereto. Those digital signals are applied to a transmission unit 20*a* which is timed so that the digital signals corresponding to each analog signal are formed into a digital word and these words are applied to the logic machine 10 where they may be stored in memory units of the serial memory 10*c* or applied directly to logical elements. The words stored in the different memory units may be applied in parallel to logical elements of the logic machine 10 to perform a desired operation. In this manner the logic elements operate on the applied digital information in parallel, the results of which are conducted by way of leads 25*a* to a shift register 25 where the information may be stored until applied to a digital-to-analog converter 26. The output of the converter 26 is applied back to the analog computer 11 and by way of its patch panel 11*a* to the analog computing elements.

The logic machine includes a comparator 30 and a switch system 40, each of which has direct connections to the analog computer 11 and have been shown as separate blocks. The comparator 30 includes comparator circuits, each of which is connected to the output of two analog computing elements so that upon a predetermined change in level of these outputs a digital signal is produced which is applied to logical elements of the logic machine 10. The switch system 40 comprises a plurality of switches, each of which may be controlled by a logical element in the logic machine 10. In this manner, each of the switches may be utilized to connect or to disconnect the output of one analog computing element from the input of another analog computing element. There is further provided a mode control 10*b* which also has direct connections to the analog computer 11 so that the modes of the logic machine 10 may be used to control the modes of the computer 11.

With the above understanding of the overall block diagram FIG. 1 of the entire computing system, there will now be described the system in more detail by reference to FIGS. 2–4, which when taken together in the manner shown in FIG. 1, illustrate the computing system.

The logic machine 10 comprises a plurality of logical elements, such as flip-flops, gates, arithmetic units and memory units. The detailed circuitry of such AND gates, flip-flops and registers will later be described in detail, and it will be understood that logical elements utilized in the logic machine 10 may be selected from circuits well-known in the art and examples of which are described in the texts, such as Millman and Taub, "Pulse and Digital Circuits," McGraw-Hill, 1956. The input and output circuits of such logical elements may be connected to individual terminals of the patch panel 10*a* of the logical machine 10. In this manner, selected inputs and outputs of different logical elements may be connected in a desired manner. It will be understood that, in special purpose computing systems adapted to simulate specific problems, the above referred to patch panel interconnections may be permanently wired. On the other hand, in large general purpose computing systems adapted to simulate a variety of different problems, such patch panel connections will be of the reversible type.

The outputs from the logical elements may be connected by way of conductors 25*a* to individual flip-flops of the shift register 25. For example, thirteen parallel outputs from logical elements may be used as thirteen inputs to the shift register 25 with each input being applied to an individual flip-flop of the register. In this manner, such digital information is stored in the shift register 25 and may be read out from output terminals 25*b–n* which are connected to the input of the digital-to-analog converter 26. The register 25 may be changed from the foregoing parallel operation to serial operation by selective switching of the terminal 25*p* so that digital words in serial form may be applied to the serial input terminal 25*r*. Upon application of clock pulses to the terminal 25*s*, the serial information is shifted through the register and then applied to the converter 26. The foregoing operation of the register 25 will later be described in detail. The output analog signals produced by the converter 26 are applied to the analog computer 11 and by way of its patch panel 11*a* to the different analog computing elements.

Individual analog signals may be taken from the analog computer by way of the patch panel 11*a* and by way of conductors 17*a–d* to a multiplexer 16. It will be understood that many more inputs may be applied to multiplexer 16 as indicated by the dotted lines, and for example, thirty-two inputs may be applied to multiplexer 16. Such inputs and associated circuits are substantially identical in construction and need not be shown in detail. The input analog signals to the multiplexer 16 are each applied to individual gating circuits 18*a*–18*d* which may be of the diode type as described by Millman and Puckett in "Accurate Linear Bidirectional Diode Gates," Proceedings of the IRE, January 1955, pages 29–37. The conductivity state of each of the gates 18*a–d* may be controlled by an individual binary input which is supplied by way of conductors 19*a–d* from a binary switch 21. Switch 21 is of the well known type which operates on a selected binary code to provide one and only one output in a "1" state at any one time on thirty-two output terminals. In this manner, the gates 18*a–d* may be selected to be rendered conductive in sequence so that only one analog signal at any one time is selected to be applied to the OR gate 16*a*. Thus, the analog signals applied to the multiplexer 16 appear in sequence at the output conductor 16*b* and are then applied in this sequence to the analog-to-digital converter 20.

The sequence or serial analog signals applied to the converter 20 are converted to digital information so that for each analog signal there is produced twelve bits corresponding to the analog signal and a thirteenth bit indicating the sign of the analog signal. These thirteen bits plus three extra "flag" bits, for a total of sixteen bits, comprise a word length with the word occurring from time $T_1$ to time $T_{16}$.

In order to form the thirteen bits into a serial word, the outputs of the converter 20 are applied to a transmission unit 20*a*. The twelve bits are each applied to individual AND gates 23*a–l* with the remaining inputs of each of these AND gates having applied thereto pulses corresponding to times $T_5$–$T_{16}$. In this manner, the AND gates 23*a–l* are enabled in sequence from time $T_5$ to time $_{16}$ and the outputs of these AND gates are applied to an OR gate 24. In addition, the sign output is applied to AND gate 24*m* with the remaining input of that AND gate having applied thereto a signal in a "1" state at time $T_4$ so that the sign bit occurs in the word at time $T_4$.

It will be understood that the digital output of the converter 20 also is applied to a register 22 of the transmission unit 20*a*. In this manner, the digital information may be conducted in parallel by way of conductor 22*a* from the register 22 to the logical elements of the logic machine 10.

The output of the transmission unit 20*a* may be applied by way of conductors 22*b* and 22*c* to the memory 10*c* where different words may be stored by different memory units of the serial memory 10*c*. Each of the memory units, which are later described in detail, includes provision for the flag bit which may occupy the first three positions of each word, viz during times $T_1$, $T_2$ and $T_3$. These words may be stored in the memory unit for long term storage and may be read out in parallel as desired to the logical elements.

The switch system 40 comprises a plurality of diode switches 41–41*e*, each of which may be of the diode gate type described in the above cited article by Millman and Puckett. For example, the diode gate 41 is connected by way of a conductor 42 to the output of a first analog computing element in the computer 11 and by way of a conductor 43 to an input of a second analog computing element. The control signal for the diode gate 41 may be provided by a desired logical element in the logic machine 10 and is connected thereto by way of conductors 44. In this manner, a control signal from the foregoing logical element may be utilized to control the conductivity of the gate 41 so that the output of the first computing element is connected or disconnected from the input of the second computing element. The remaining switches 41*a*–41*e* operate in similar manner under control of other logical elements in the logic machine 10 to connect and disconnect other computing elements.

The comparator 30 comprises a plurality of analog comparator circuits 31–31*d* and such circuits are described in detail in a text edited by Husky and Korn, entitled "Computer Handbook," McGraw-Hill, 1962, at pages 3–70 et. seq., and 6–32 et. seq. In the operation of comparator circuit 31 an analog signal from each of two analog computing elements may be applied by way of conductors 32 and 33 to the input of a comparator circuit 31. A digital output signal will be obtained from the output circuit of comparator 31 upon a change in predetermined level of those analog input signals. For example, if the algebraic sum of the analog signal on conductor 32 and the analog signal on conductor 33 is a positive signal, then a digital output in a "1" state may be produced. On the other hand, if the sum is a negative signal then, the digital output may be in a "0" state. Such a digital output from each of the comparators 31–31*d* may be applied by way of conductors 34 to logical elements in the logic machine 10.

Figures 5, 6:
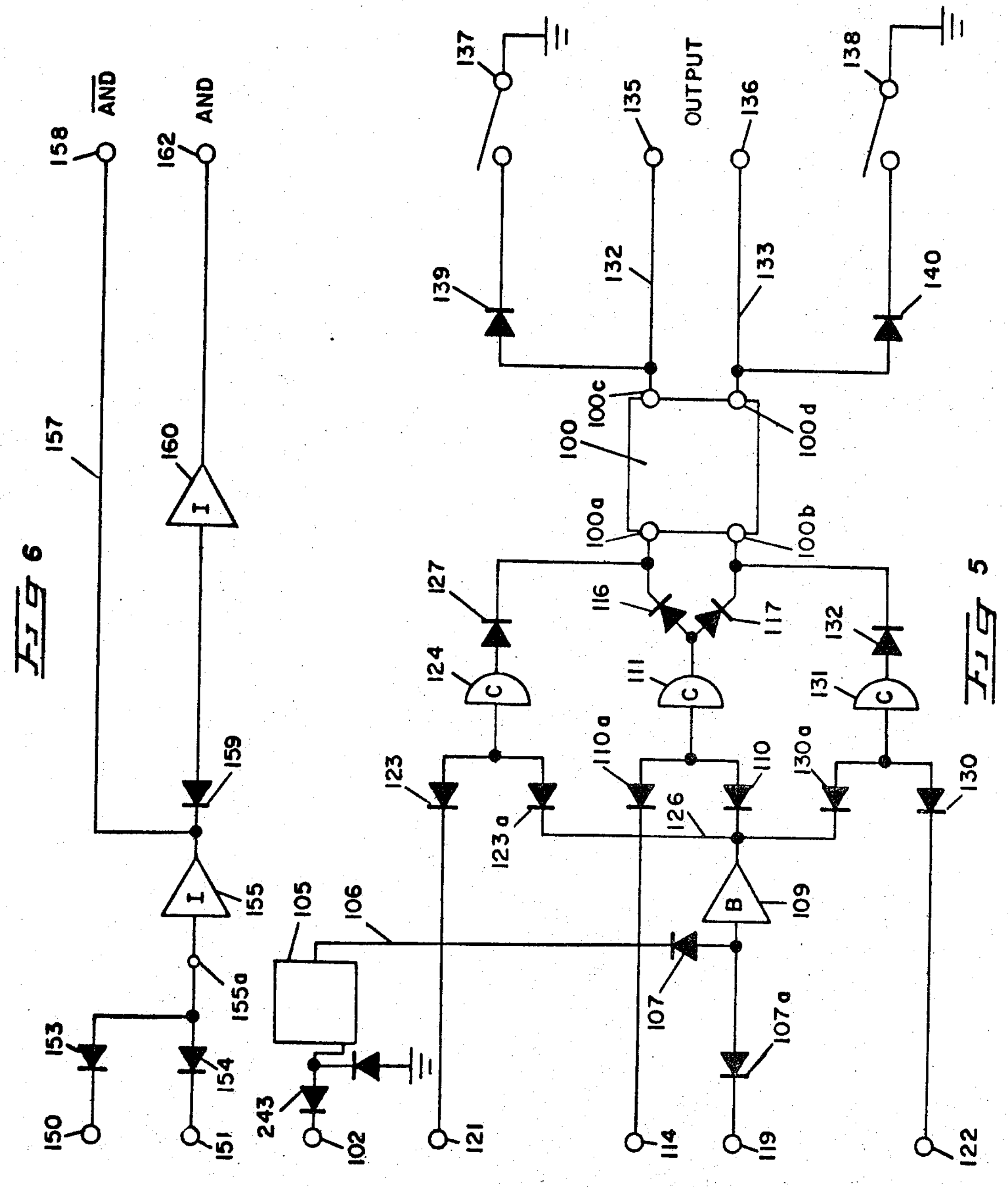
FIG. 5 illustrates schematically a flip-flop circuit as used in the logic machine of FIGS. 1 and 2.
FIG. 6 illustrates schematically an AND gate as used in the logic machine of FIGS. 1 and 2.
Figure 7:
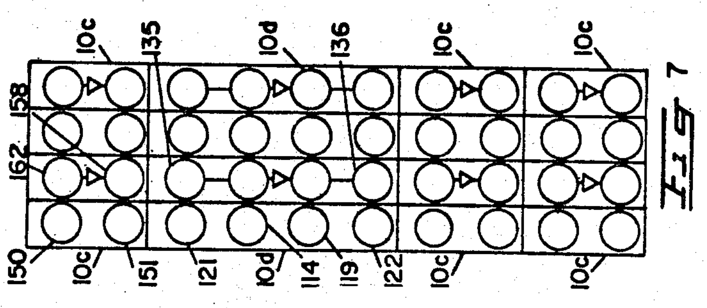
FIG. 7 illustrates a portion of the patch panel of FIGS. 1 and 2.

Referring now to FIGS. 5 and 6 there are respectively shown a flip-flop circuit and an "AND" gate, each representing one of many such circuits in the logical machine 10. In FIG. 7 is shown one section of the patch panel 10*a*, the sections 10*c* showing the input and output plug terminals for the "AND" gates of the type shown in FIG. 6. The sections 10*d* indicates the input and output plug terminals of flip-flop circuits of the type shown in FIG. 5.

For the purpose of this description it will be assumed in binary notation that a logical signal "0" or "0" state is represented by a potential substantially equal to ground potential or zero volts and that a logic signal "1" or "1" state is represented by a positive potential.

In FIG. 5 there is shown a flip-flop circuit 100 of the type well known in the art which includes a set input terminal 100*a*, a reset input terminal 100*b*, a "1" output terminal 100*c*, and a "0" output terminal 100*d*. Positive going clock signals are applied to an input terminal 102 and are conducted by way of diode 243 to the input of a monostable multivibrator 105 described in detail in FIG. 10. Upon application of a positive going clock pulse, a positive going signal is produced at the output of the multivibrator 105 which signal is conducted by way of lead 106 to render diode 107 nonconductive. The anode of nonconductive diode 107 is connected to the input of a buffer 109 and also to the anode of diode 107*a*. It will be assumed that an enable signal in a "1" state is applied to an enable terminal 119 which is effective to render diode 107*a* nonconductive. With diodes 107*a* and 107 nonconductive, the input to buffer 109 is a logic signal "1" to provide an output in a "1" state which is applied to a diode 110. Diode 110 and diode 110*a* are two input diodes of an "AND" gate which also comprises a gating circuit 111. Such a gating circuit is described and claimed in application Ser. No. 213,633 filed July 31, 1962, by Harold R. Greene, entitled Charge Gate and assigned to the same assignee as the present invention now U.S. Pat. 3,184,607. It will be understood that other well known types of AND gates may be used for this purpose or for any purpose to be described where an AND gate is required.

The diode 110*a* is connected to a trigger input terminal 114 to which is normally applied a trigger signal in a "1" state. With a signal in a "1" state applied to its cathode, diode 110*a* is rendered nonconductive and upon application of a clock pulse the diode 110 is also rendered nonconductive. As a result there is produced an output signal from the gate 111 in a "1" state (a positive potential) which is in accordance with the logic table. That positive going signal is effective to render conductive diodes 116 and 117 so that a positive potential is applied to both input terminals 100*a* and 100*b* of the flip-flop 100. Thus flip-flop 100 is switched from one to the other of its stable states for every clock pulse as long as the input trigger signal applied to terminal 114 and the enable signal applied to terminal 119 are in a "1" state.

The two remaining inputs for the flip-flop circuit are the set input terminal 121 and reset input terminal 122, which may be used to respectively set and reset flip-flop 100 when a "0" state input signal is applied to input terminal 114. Input signals applied to the set terminal 121 are conducted by way of an AND gate diode 123 to the input of a charge gate 124. The remaining diode 123*a* of that AND gate has signals applied thereto from the clock by way of a conductor 126. Thus, upon application of a set signal in a "1" state and a clock pulse there is produced at the output of the gate 124 a positive going signal which is conducted by way of a diode 127 to the upper input terminal 100*a* of the flip-flop 100. In this manner the flip-flop 100 is switched to its set state.

It will also be understood that a "1" state input applied to a reset terminal 122 is effective to render nonconductive a diode 130. Upon application of a clock pulse diode 130*a* is rendered conductive to produce a "1" state output from gate 131 which is applied by way of a diode 132 to the input terminal 100*b* of flip-flop 100 to switch that flip-flop to its reset state.

The "1" state output terminal 100*c* of flip-flop 100 is connected by way of a conductor 132 to an output terminal 135 and the "0" state output terminal 100*d* is connected by way of a conductor 133 to an output terminal 136. The flip-flop 100 may be manually switched from one to the other of its stable states by means of switches 137 and 138. Specifically, terminal 100*c* is connected by way of a diode 138 and switch 137 to ground. Thus, when the switch 137 is in its closed position, the flip-flop 100 is switched to its reset state. In similar manner the output terminal 100*d* is connected by way of a diode 139 and the switch 138 to ground. When switch 138 is closed, the flip-flop is set.

Referring now to FIG. 6 there is shown an AND gate having two input terminals 150 and 151 which are connected by way of diodes 153 and 154, respectively, to an input terminal 155*a* of an inverter 155. With an input signal in a "1" state applied to terminal 150 and an input signal in a "0" applied to terminal 151 the potential at terminal 155*a* will be approximately ground potential and the output signal of inverter 155 will be in a "1" state which is applied by way of a conductor 157 to an $\overline{\text{AND}}$ (not AND) output terminal 158. Thus, in accordance with the well known truth table a "1" and a "0" input to an AND gate produces a $\overline{\text{AND}}$ output in a "1" state.

With input signals in a "1" state applied to both terminals 150 and 151 it will be understood that there is produced at the input 155*a* of the inverter 155 a "1" state signal. Thus, the output signal of inverter 155 is in a "0" state which is applied by way of a diode 159 to a second inverter 160 which produces an output in a "1" state at the terminal 162. Thus, in accordance with the truth table, with both inputs in a "1" state the $\overline{\text{AND}}$ terminal 158 provides a "0" state signal while the AND terminal 162 provides a "1" state output signal.

Figure 8:
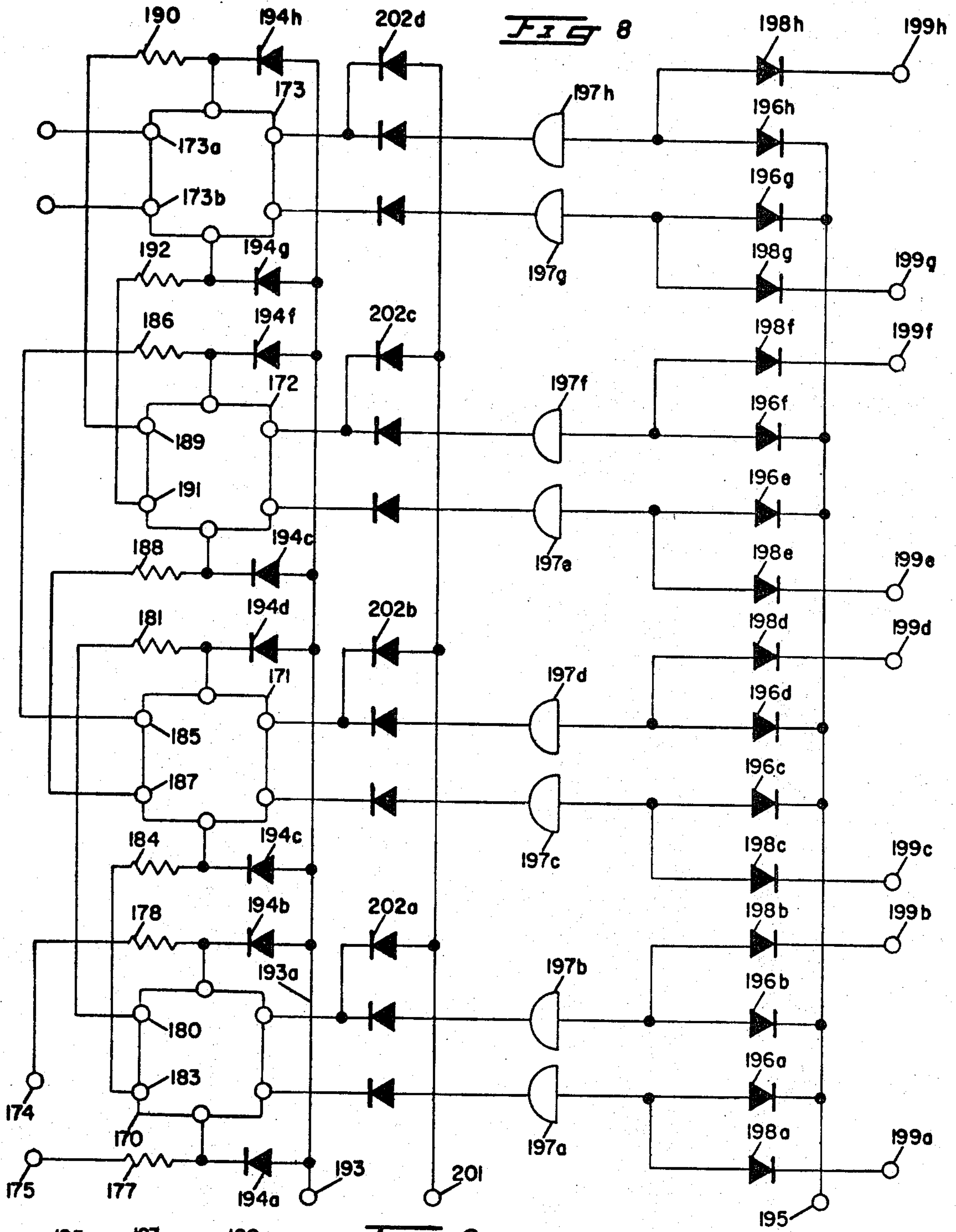
FIG. 8 illustrates schematically a shift register as used in the logic machine and in the shift registers of FIGS. 1 and 2.

Coming now to FIG. 8 there is shown a shift register comprising four flip-flops 170–173 which may be utilized as a logical element of the logic machine and as a portion of the register 25, FIG. 4 and the register 22, FIG. 2. However, it will be understood that other shift registers well known in the art may be used.

Figure 9:
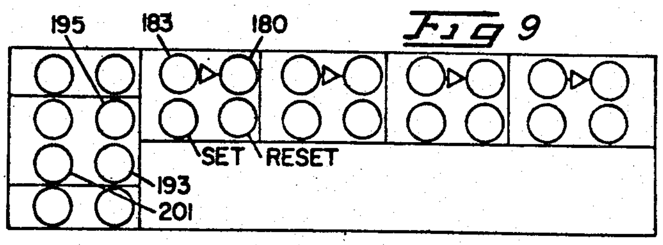
FIG. 9 illustrates a portion of the patch panel of FIGS. 1 and 2.

In FIG. 9 there is shown a portion of the patch panel 10*a* including the input and output terminals of the shift register of FIG. 8. The shift input terminals 174 and 175 are connected by way of resistors 177 and 178 respectively to the two shift input terminals of a flip-flop 170. The "0" output terminal 180 of the flip-flop 170 is connected by way of a resistor 181 to the upper shift input of flip-flop 171 and the "1" output 183 of the flip-flop 170 is connected by way of a resistor 184 to the lower shift input of flip-flop 171. The foregoing shift pattern is continued with the two remaining flip-flops 172 and 173 with terminal 185 being connected by way of a resistor 186 to the upper shift terminal of flip-flop 172 and the terminal 187 being connected by way of resistor 188 to the lower shift terminal. Further, the terminal 189 is connected by way of a resistor 190 to the upper shift terminal of flip-flop 173 while the terminal 191 is connected by way of a resistor 192 to the lower shift terminal. The output terminals 173*a* and 173*b* of flip-flop 173 provide the serial output terminals for the serial register.

The clock pulses are applied to clock input terminal 193 to provide the shift pulses for the register. The clock pulses are applied by way of conductor 193*a* through diodes 194*a–h* to each of the shift input terminals of the flip-flops 170–173. In this manner, upon application of clock pulses to the terminal 193, the input signals applied to the terminals 174 and 175 are shifted from one to the other of the flip-flops until the signals are shifted out of the serial output terminals 173*a* and 173*b*.

The flip-flops 170–173 may operate independently one from the other if the clock pulses are disconnected from the terminal 193 and are applied instead to terminal 195. As a result clock pulses are conducted by way of a lead line 195*a* to render nonconductive diodes 196*a–h* each of which comprises one diode of a two diode AND circuit. The second diode 198*a–h* of each of the AND gates has applied thereto input signals from input terminals 199*a–h*. Thus, if a signal in a "1" state is applied to the terminal 199*a*, for example, the flip-flop 170 is set and if a signal in a "1" state is applied to that terminal 199*b* that flip-flop is reset. A signal in a "1" state may be applied to the clear input terminal 201 which is conducted by way of diodes 202*a–d* to the reset terminal of each of the flip-flops 170–173. In this manner, a clear signal is effective to switch all of the flip-flops to their reset states.

Figure 10:
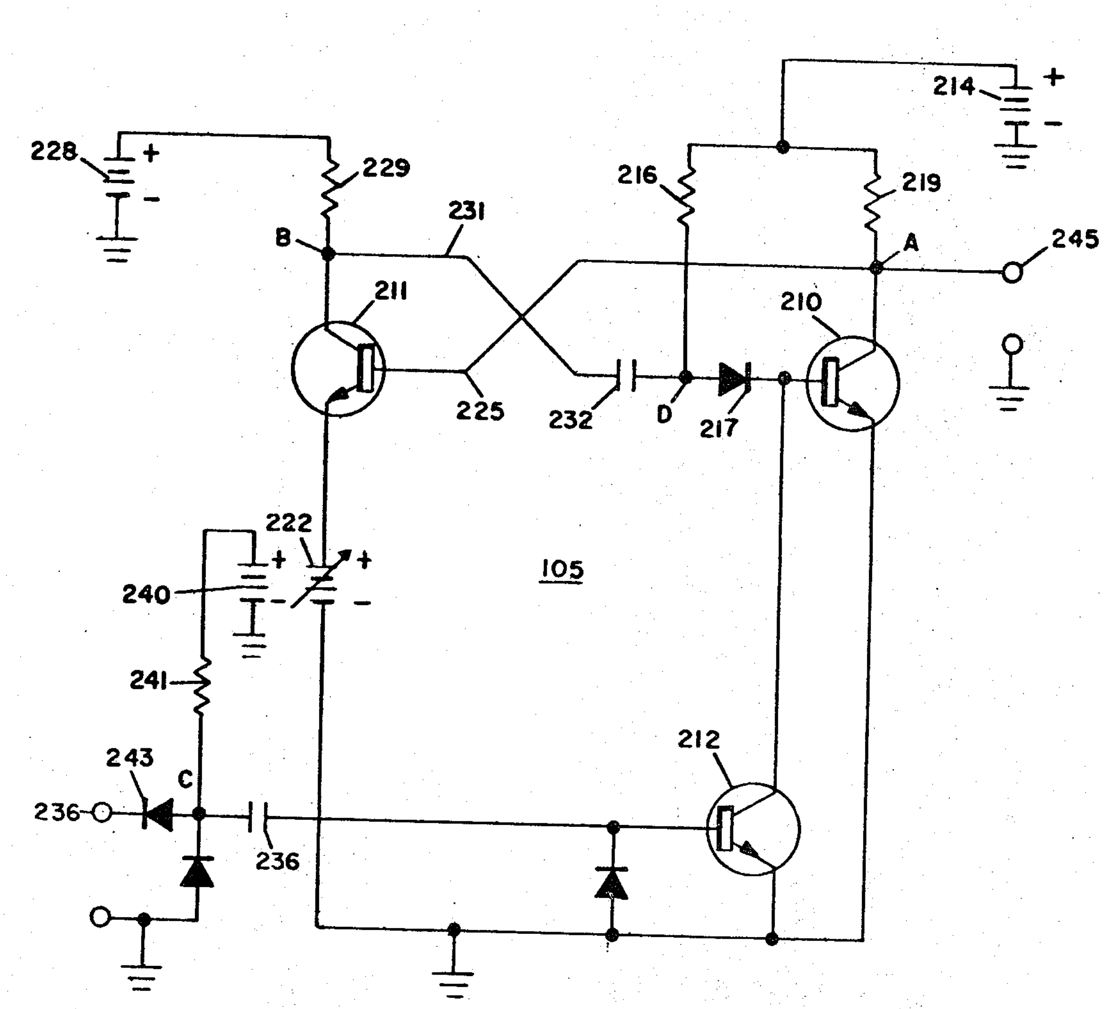
FIG. 10 illustrates schematically a monostable multivibrator utilized in the flop-flop of FIG. 5.

Referring now to FIG. 10, there is shown a monostable multivibrator as shown in block diagram form on FIG. 5, and which may be used as a logical element in the logic machine. This monostable multivibrator is described in detail in an application, Ser. No. 276,768 filed Apr. 30, 1963, by Harold R. Greene, entitled, "Multivibrator," and assigned to the same assignee as the present invention, now U.S. Pat. 3,213,297. The multivibrator comprises two switching transistors 210 and 211 of the NPN type and a trigger transistor 212, also the NPN type. In the multivibrator stable state the transistor 210 is normally conductive and the transistor 211 is normally nonconductive. Transistor 210 is maintained normally conductive as a result of current flow through its emitter-base junction of a predetermined value. This current flows from the positive side of a battery 214 through a resistor 216, a diode 217, and through the emitter-base junction of transistor 210 to ground. With transistor 210 conductive, there is provided a low impedance path from collector to emitter thereof so that current flows from a positive side of battery 214 through resistor 219, point A, the collector, base and emitter of transistor 210 and then to ground.

The multivibrator being in its stable state transistor 211 is maintained normally nonconductive by the application to its emitter of a positive bias relative to its base. That bias is provided by an adjustable DC bias source schematically shown as an adjustable battery 222 connected between the emitter of transistor 211 and ground. The base of transistor 211 is effectively connected to ground by way of cross connection 225, point A, and the conductive transistor 210 to ground. Thus, with ground potential applied to its base and a positive potential applied to its emitter, transistor 211 is maintained nonconductive.

With transistor 211 nonconductive during the stable state, there is provided a very high impedance between its collector and its emitter. Thus a charging circuit for the coupling capacitor 232 may be traced from the positive side of a battery 228 through resistor 229, point B, cross connection 231, capacitor 232, normally conductive diode 217, base-emitter junction of conductive transistor 210 and then to ground.

With capacitor 232 charged to its steady-state value, it will be understood that its left-hand plate will be charged positive and its right hand plate negative with a potential therebetween approximately equal to the potential of battery 228.

When the monostable multivibrator is to be switched or changed from a stable to its quasi-stable state, a positive going step is applied to the input terminal 236. Accordingly, the diode 243 is rendered nonconductive and this abrupt change produces a positive going pulse which is applied by way of capacitor 236 to the base of transistor 212 rendering that transistor conductive. With transistor 212 conductive, there is provided a low impedance path from collector to emitter thereof so that the base of transistor 210 is effectively brought to ground potential to cause transistor 210 to be rendered nonconductive. With transistor 210 rendered nonconductive an abrupt change of potential is applied by way of cross connection 225 to the base of transistor 111 and that transistor is rendered conductive so that the multivibrator is now switched to its quasi-stable state.

With transistor 211 conductive, a negative-going pulse is applied by way of cross connection 231 and capacitor 232 to the diode 217 rendering that diode nonconductive. In this manner diode 217 is effectively isolated from point D and from the coupling capacitor 232 so that the input circuit is isolated from the discharge circuit of that capacitor.

As capacitor 232 discharges, point D rises in potential in a positive-going direction until it is sufficient to render conductve both diode 217 and the emitter-base junction of transistor 210. At that time the potential at point A decreases to produce an abrupt change in potential which is applied by way of cross connection 225 to the base of transistor 211. In this manner transistor 211 is rapidly rendered nonconductive to cause point B to rise in potential. Thus with transistor 210 rendered conductive and transistor 211 rendered nonconductive the quasi-stable state has been terminated and the multivibrator has been returned to a stable state.

It will be remembered that during the quasi-stable state, upon application of the positive-going pulse the diode 243 has been rendered nonconductive and the trigger transistor 212 has been rendered conductive. At that time a charging circuit for capacitor 236 may be traced by way of the positive side of battery 240, resistor 241, point C, capacitor 236, the emitter-base junction of transistor 212, ground and to the negative side of battery 240.

Figure 11:
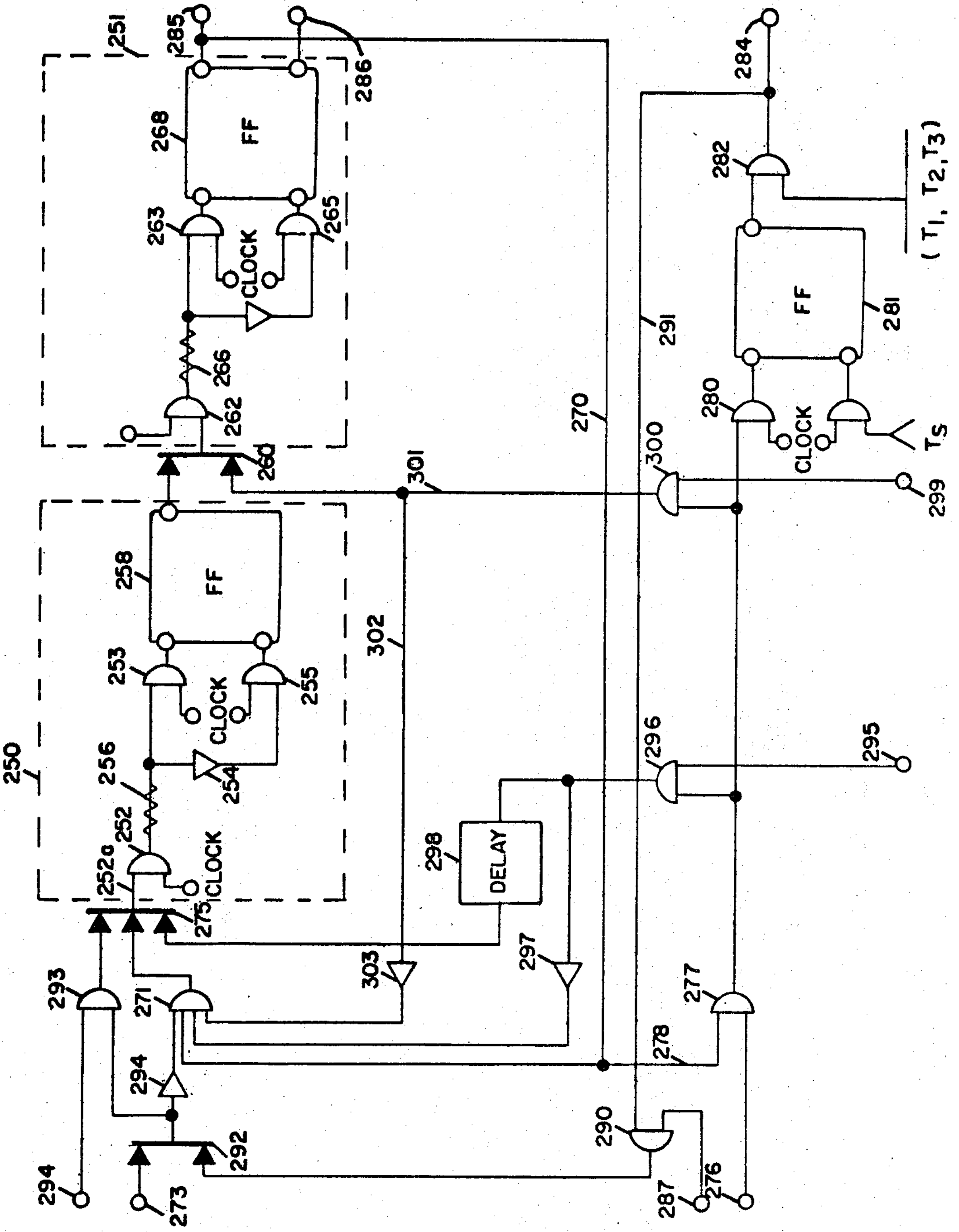
FIG. 11 illustrates schematically one of the serial memory units of FIGS. 1 and 2.

Coming now to FIG. 11 there is shown a serial memory unit which may be one of several units comprising the memory 10*c* as shown in FIG. 1. The memory unit is designed to operate with sixteen bit words with thirteen of the sixteen bits being data, while the remaining three bits are "flags" or special identification bits. A memory unit is described in detail in an application Ser. No. 399,232, filed Jan. 21, 1964, assigned to the assignee of the present application and now U.S. Pat. No. 3,308,440 issued Mar. 7, 1967.

The delay circuit 256 may provide a one word delay and the delay circuit 251 may provide a two hundred and fifty-five word delay and at the end of the total delay time the words are fed back to the input of the delay circuit 250 to recirculate the stored words for long term storage.

The one word delay circuit 250 includes an AND circuit 252 having an input 252*a* and a second remaining input connected to a source of clock pulses. The output of AND circuit 252 is connected by way of a magnetostrictive one word delay line 256 to the input of a second AND circuit 253 and also by way of an inverter 254 to a third AND circuit 255. Each of the remaining inputs of the AND circuits 253 and 255 are connected to a source of clock pulses while the outputs of these AND circuits are respectively connected to the set and reset input terminals of a flip-flop 258. In this manner an input signal applied to the circuit 250 is delayed one word by the delay line 256 and such a logic signal in a "1" state would be effective to set the flip-flop 258, while a logic signal in a "0" state would be effective to reset the flip-flop.

The output of the delay circuit 250 is connected by way of an OR circuit 260 to the input of the delay circuit 251. The circuit 251 is identical to the circuit 250 except that the magnetostrictive delay line 266 provides a delay time duration of two hundred and fifty-five words. Thus, the words are applied to an AND circuit 262 through the delay circuit 266 and to AND gates 263 and 265. The outputs of the AND gates 263 and 265 are connected to the set and reset terminals respectively of a flip-flop 268.

The "1" state output of the flip-flop 268 provides an output for the memory unit and the digital information from the output is also recirculated by way of a conductor 270 to the input of an AND circuit 271. With the load line input terminal 273 in a "0" state, it will be understood that the upper input terminal of the AND gate 271 is in a "1" state and it will be assumed that the lower two input terminals are also in a "1" state. Therefore, the output of the delay circuit 251 is recirculated through the AND gate 271 and by way of an OR gate 275 to the input of the one word delay circuit 250.

It will be remembered that the length of a word is sixteen bits with the first three bits at times $T_1$, $T_2$ and $T_3$ being the flag bits. It will be assumed that at least one word of the words being recirculated includes a bit in a "1" state at time $T_1$. If it is desired to locate that word having a flag bit at time $T_1$, there is applied to a flag terminal 276 a bit in a "1" state at time $T_1$. Thus, at time $T_1$ an AND gate 277 is enabled so that if the word being recirculated by way of conductor 270 contains a flag bit at time $T_1$ then gate 277 produces a "1" state bit at that time. That "1" state bit is effective by way of an AND gate 280, a flip-flop 281 and AND gate 282 to produce a "1" state output at the flag data output terminal 284. Thus, a bit in a "1" state at output terminal 284 indicates that a flagged word is being recirculated and such flagged word may be read out at output terminals 285 and 286 of the serial memory.

In addition to a flag input being applied to the terminal 276 at time $T_1$, for example, a bit in a "1" state may be applied to a write terminal 287. That signal enables an AND gate 290 so that the "1" state output conducted from flag data output terminal 284 by way of conductor 291 produces a "1" state output from gate 290. That "1" state output is applied to an OR gate 292, the "1" state output of which (1) enables AND gate 293 and (2) is inverted by an inverter 294, thereby to disable AND gate 271. With gate 271 disabled, the word flagged is prevented from being recirculated and a new word may be applied to input terminal 294. In this manner a new word may be substituted for the flagged word with the new word being applied through the enabled AND gate 293 and OR gate 275 to the input of the delay circuit 250.

It will also be understood that a new word may be selected to be read into the memory unit by way of the input terminal 294 to replace a word being recirculated by simply applying to the load line 273 a signal in a "1" state. Thus, the recirculating AND gate 271 is disabled while the input AND gate 293 is enabled.

There is additionally provided provision for the application of an advance flag signal to be applied by way of input terminal 295 to an AND gate 296. The remaining input of AND gate 296 is connected to the output of AND 277. Thus, if the advance flag input terminal 295 has applied thereto a signal in a "1" state and the recirculating word is flagged, then there is produced a "1" state output from AND gate 296. This output corresponds to a flag and is effective by way of an inverter 297 to disable the AND gate 271 for the time of the flag so that the recirculating flag is prevented from being conducted therethrough. At the same time, the flag output of the AND gate 296 is delayed one word by a one word delay circuit 298 so that a flag appears at that time one word later. In similar manner, a retard input terminal 299 is connected to an input of an AND gate 300 with the remaining input being connected to the output of AND gate 277. Thus, upon appearance of the flagged word, a "1" state signal is applied by way of conductors 301 and 302 and through an inverter 303 to disable the AND gate 271. At the same time, the "1" state flag is applied by way of condutcor 301 to an input of OR gate 260 so the flag is effectively placed in a word one word ahead of its previous position.

Figures 12, 13:
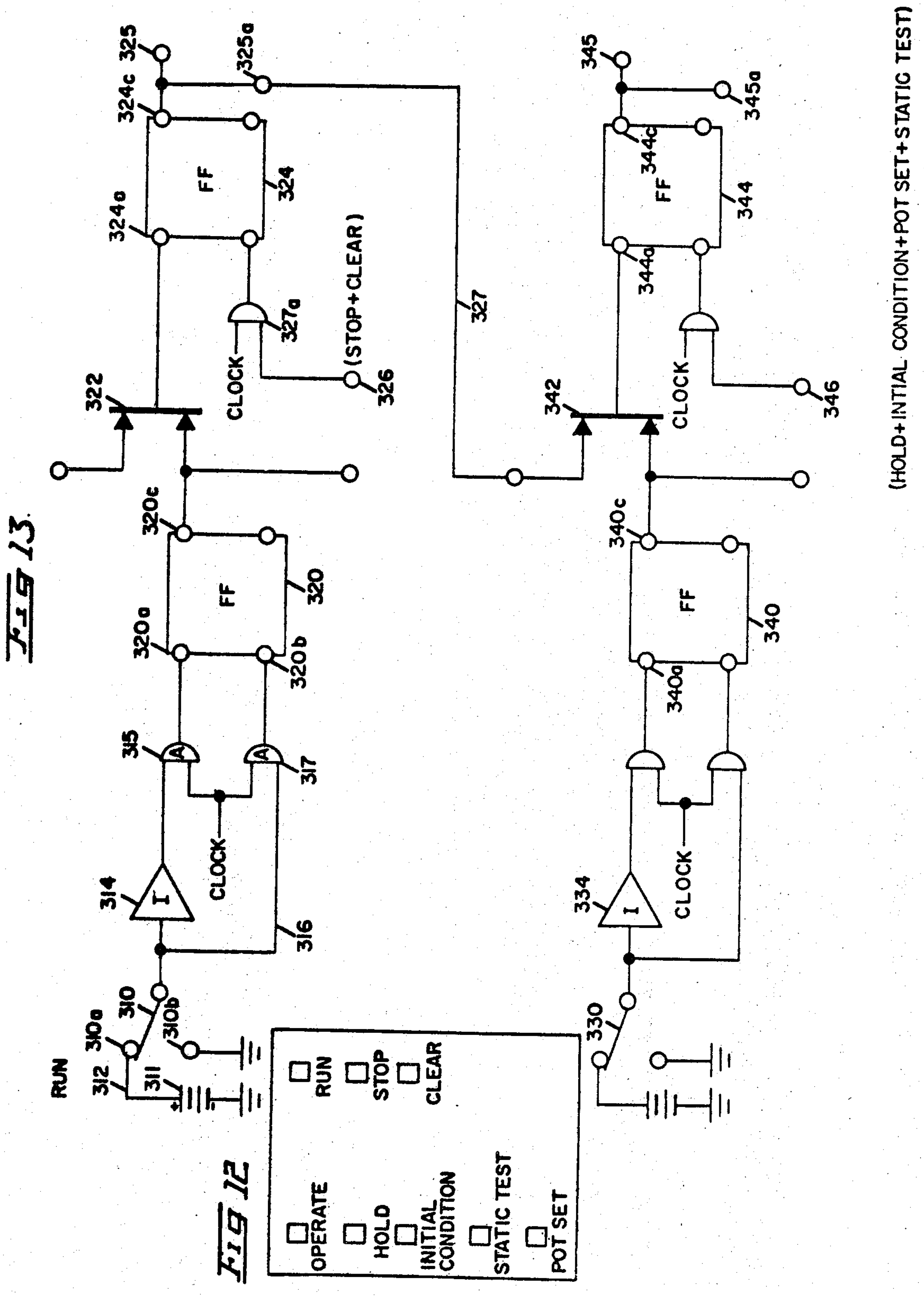
FIG. 12 illustrates a portion of the patch panel of FIGS. 1 and 2.
FIG. 13 illustrates in block diagram of the mode control of FIGS. 1 and 2.

Referring now to FIG. 12, there is shown a control panel for a mode control for controlling the mode of the logic machine, as well as the analog computer. Specifically, the operational mode of the logic machine may be changed between run, stop and clear. In the run mode the clock pulses are applied to all of the logical elements and thus the logic machine operates to control the computing system. In the stop mode the clock is disconnected from each of the logical elements so that these elements remain in their previously set state. In the clear mode the clock is also disconnected from all of the logical elements and, in addition, a signal in a "1" state is applied to the reset terminals of each of the flip-flops so that all of the logical elements are reset to their "0" state.

The analog computer is operated in synchronism with the modes of the logic machine 10 and such modes may be operate, hold, initial condition, static test and pot set. The operation nad circuitry involved in such modes for an analog computer are well-known in the art and are described, for example, in the above-cited text, "Computer Handbook," at page 4–3 et. seq.

In FIG. 13 there is shown a circuit for operation of the run mode of the logic machine with a connection to the operate mode of the analog computer, so that when the run button is depressed and the logic machine is put in its run mode, the analog computer 11 is also placed in its operate mode. Specifically, a run button 310 is normally connected to an upper contact 310*a* so that the positive potential from a battery 311 is applied by way of a conductor 312, contact 310*a*, switch 310 and an inverter 314 to one input of an AND gate 315. As a result of a positive potential applied to its input the, inverter 314 produces a "0" state output potential thereby to disable AND gate 315. In addition, the positive potential from battery 311 is applied by way of a conductor 316 to enable an AND gate 317. Upon application of a clock pulse to the remaining terminal of AND gate 317, an output in a "1" state is applied to a reset terminal 320*b* of a flip-flop 320 so that a "0" state output is provided at an output terminal 320*c* of that flip-flop.

When the run button 310 is momentarily depressed to thereby ground contact 310*b*, a signal in a "1" state is produced at the output of inverter 314 to enable AND gate 315, and upon application of a clock pulse the flip-flop 320 is set to produce a "1" state output from its output termial 320*c*. That output is applied by way of an OR gate 322 to an input terminal 324*a* of a flip-flop 324, thereby to set that flip-flop. With flip-flop 324 in a set state, a "1" state output signal is produced at an output terminal 324*c* and applied to a run output terminal 325. Such signal is effective to operate a relay, for example, to connect the clock to all of the clock inputs of each of the logical elements of the logic machine 10.

In addition, the output terminal 324*c* is also connected to an additional terminal 325*a* and by way of a conductor 327 to an input of an OR gate 342. A a result, a "1" state signal is applied by way of conductor 327 and gate 342 to a set input terminal 344*a* of a flip-flop 344 which controls the operate mode. As a result, a "1" state signal is produced at an output terminal 344*c* and at an operate output terminal 345 to place the analog computer 11 in its operate mode. It will be understood that an operate button 330 may be depressed and the circuit elements for the operate mode will operate in similar manner to that described for the run mode. In this manner, the analog computer may be set in its operate mode independently of the run mode of the logic machine 10.

In order to change from the run mode, for example, a circuit similar to that described in FIG. 13 may be used for the stop mode. The output of that stop mode circuit may be connected to a terminal 326 to enable an AND gate 327*a* and, upon application of a clock pulse, to reset flip-flop 324. Thus, there is produced a "0" state signal from the run output terminal 325. In similar manner, if a clear signal is applied to the terminal 326, a "0" state signal is produced at the run output terminal. In addition, if a hold, initial condition, pot set or static test siganl in "1" state is applied to an input terminal 346, the operate flip-flop 344 will be reset to produce a "0" state signal at an operate mode output terminal 345*a*.

It will be understood that each of the modes may be controlled by a circuit similar to those shown in FIG. 13 and that these circuits may be interconnected in any desired manner. Further, a control signal may be used to energize individual analog computing elements such as integrators to change the mode of such individual integrator between operate, hold and initial condition. In addition, selected logical elements of the logic machine 10 may be utilized to operate the mode controls of the computer 11.

Now that the principles of the invention have been explanied, it will be understood that many modifications may be made. For example, in the serial memory unit of FIG. 11, the delay line 266 may provide delays of other than two hundred and fifty-five words such as, for example, fifteen or sixty-three words. For these examples, the total delay of the memory unit would be sixteen and sixty-four words respectively. It will be understood that the total delay may be only one word by using the delay circuit 250 alone without the delay circuit 251.

In a further modification of the invention, the logical elements of the logic machine 10 may perform other control functions for the analog computer such as the selection and setting of potentiometers.

What is claimed is:

1. A parallel logic machine for controlling the mathematical capability of an analog computer having analog computing elements, said machine comprising:

a plurality of logical elements interconnected to generate a digital signal representative of a particular logic function, means for converting an analog output signal of said analog computing elements to digital information, means for directly applying said digital information in parallel to selected logical elements to simultaneously generate said digital signal representing parallel logical operations performed on said digital information, and additional means for converting said last-named digital signal to analog form and for applying said converted analog signals to said analog computing elements.

2. The parallel logic machine of claim 1 in which there is provided serial memory means comprising a plurality of units having applied directly thereto said digital information from said converting means and means for applying selected digital information from outputs of said serial memory units in parallel to said logical elements.

3. The parallel logic machine of claim 2 in which each said serial memory unit includes means for providing selected digital information with special identification bits for selective readout, and for selectively reading out from each said memory unit digital information having predetermined special identifications bits.

4. The parallel logic machine of claim 3 in which there is provided means for allowing the entry of digital information to be stored by said serial memory unit when said digial information having predetermined special identification bits is selectively read out and in which there is provided means for selectively retarding and advancing said special identification bits in said stored digital information.

5. A parallel logic machine for controlling analog computing elements comprising:

a plurality of logical elements, means for converting the analog output signals of said analog computing elements to digital information means for directly applying said digital information in parallel to selected logical elements for performing logical operations on said digital information, and control means for selectively applying clock signals to each of said logical elements for synchronized operation of said logical elements and for selectively preventing the application of said clock signals to stop the operation of said logical elements on said digital information.

6. The parallel logic machine of claim 5, where said analog computing elements are adapted to operate in a hold mode and in an operate mode and in which machine there is provided means for selectively controlling the modes of said analog computer in synchronism with the control of said clock pulses to said logical elements.

7. The logic machine of claim 5 in which there is provided a plurality of switch means each of which is connected between the output of a first analog computing element and the input of a second analog computing element, and means connected to selected logical elements for controlling the conductivity states of said switch means for selectively connecting and disconnecting each of first analog computing elements to said second analog computing elements.

8. The logic machine of claim 5 in which there is provided a plurality of comparator circuits each of which has applied thereto an analog signal from each of two analog computing elements thereby to produce a logic signal in a first state when the algebraic sum of said two analog signals is a positive signal and to produce a logic signal in a second state when the algebraic sum of said two analog signals is a negative signal.

9. The parallel logic machine of claim 6 in which there is provided serial memory means comprising a plurality of units having applied thereto said digital information from said converting means, and means for applying selected digital information from outputs of said serial memory units in parallel to said logical elements.

10. The parallel logic machine of claim 9 in which each said serial memory unit includes means for providing selected digital information with special identification bits and means for selectively reading out from each said memory unit digital information having predetermined special identification bits.

11. The parallel logic machine of claim 10 in which there is provided means for allowing the entry of digital information to be stored by said serial memory unit when said digital information having predetermined special identification bits is selectively read out and in which there is provided means for selectively retarding and advancing said special identification bits in said stored digital information.

12. A parallel logic machine for controlling the mathematical capability of an analog computer having analog computing elements comprising:

a plurality of logical elements, means for applying clock signals to each of said logical elements for synchronized operation of said logical elements, means for converting parallel analog output signals of said analog computing elements to serial form, means for converting said serial analog output signals to digital information, means for directly applying said digital information to selected logical elements for performing a plurality of parallel logical operations on said digital information, additional means for converting said digital information which has been operated on to analog form and for applying said converted analog signals to said analog computer, and operative means for preventing the application of said clock signals simultaneously to each of said logical elements to stop the operation of said logical elements on said digital information.

13. The parallel logic machine of claim 12 in which there is provided means for preventing the application of said clock pulses simultaneously to each of said logical elements and for concurrently applying reset pulses to all of said logical elements thereby to place said logical elements in a predetermined reset state.

14. The parallel logic machine of claim 13 where said analog computer is adapted to operate in a plurality of modes and in which machine there is provided means for selectively controlling the modes of said analog computer in synchronism with the control of said clock pulses to said logical elements.

15. The parallel logic machine of claim 13 in which there is provided serial memory means comprising a plurality of units having applied thereto said digital information from said converting means, and means for applying selected digital information from outputs of said serial memory units in parallel to said logical elements.

16. The parallel logic machine of claim 15 in which each said serial memory unit includes means for providing selected digital information with special identification bits and means for selectively reading out from each said memory unit digital information having predetermined special identification bits.

17. The parallel logic machine of claim 16 in which there is provided means for allowing the entry of digital information to be stored by said serial memory unit when said digital information having predetermined special identification bits is selectively read out and in which there is provided means for selectively retarding and advancing said special identification bits in said stored digital information.

18. The logic machine of claim 14 in which there is provided a plurality of switch means each of which is connected between the output of a first analog computing element and the input of a second analog computing element, and means connected to selected logical elements for controlling the conductivity states of said switch means for selectively connecting and disconnecting each of first analog computing elements to said second analog computing elements.

19. The logic machine of claim 14 in which there is provided a plurality of comparator circuits each of which has applied thereto an analog signal from each of two analog computing elements thereby to produce a logic signal in a first state when the algebraic sum of said two analog signals is a positive signal and to produce a logic signal in a second state when the algebraic sum of said two analog signals is a negative signal.

20. The logic machine of claim 12 in which there is provided register means connected between said logic machine and said additional converting means for accumulating said digital information for application to said logical elements of said logic machine.

21. A digital operation system for an analog computer having a plurality of analog computing elements, said system comprising:

a plurality of logical elements selectively interconnected to generate a digital signal representing a particular logic function;

means connected to an analog computing element to receive an analog signal and to generate digital information in response to said analog signal;

means for directly applying said digital information in parallel to said logical elements; and means for receiving said digital signal and in response thereto to generate a second analog signal for application to one of said analog computing elements.

22. A digital operation system according to claim 21 wherein there is provided a plurality of switch means each of which is connected between the output of a first analog computing element and input of a second analog computing element; and means connected to selected logic elements for controlling the conductivity state of a said switch means for selectively connecting and disconnecting said first analog computing element to said second analog computing element.

23. A digital operation system for an analog computer having a plurality of analog computing elements, said system comprising:

a plurality of logic elements interconnected to generate digital signals;

means connected to an analog computing element to receive an analog signal and to generate digital information in response to said analog signal;

means for directly applying said digital information in parallel to said logic elements;

a plurality of switch means each of which is connected between the output of a first analog computing element and the input of a second analog computing element; and means connected to receive said digital signals and to each of said switch means for controlling the conductivity states of said switch means for selectively connecting or disconnecting said respective first analog computing elements to said respective second analog computing elements.

References Cited

UNITED STATES PATENTS

| | | | |
|---|---|---|---|
| 3,034,719 | 5/1962 | Anfenger et al. | 235—154 |
| 3,036,772 | 5/1962 | Pughe et al. | 235—154 |
| 3,221,155 | 11/1965 | Birkel | 235—154 |

OTHER REFERENCES

Martin H. Welk: Ballistic Research Laboratories Report No. 1010, June 1957, pp. 360–361.

J. Greenstein: A Two-Channel Data Link for Combined Analog-Digital Simulation AIEE, paper No. 60–10, February 1960.

Electronic Associates Incorporated, Preliminary Information Release 901–1, received in the U.S. Patent Office on Mar. 17, 1959.

MARTIN P. HARTMAN, Primary Examiner

U.S. Cl. X.R.

235—184